United States Patent [19]

Tanaka

[11] Patent Number: 4,652,892
[45] Date of Patent: Mar. 24, 1987

[54] GRADATION CONTROL DEVICE FOR THERMAL INK-TRANSFER TYPE PRINTING APPARATUS

[75] Inventor: Hideshi Tanaka, Yokohama, Japan

[73] Assignee: Victor Company of Japan, Ltd., Yokohama, Japan

[21] Appl. No.: 838,367

[22] Filed: Mar. 11, 1986

[30] Foreign Application Priority Data

Mar. 12, 1985 [JP] Japan .................... 60-49119

[51] Int. Cl.⁴ ............................ G01D 15/10; B41J 3/20
[52] U.S. Cl. ................................ 346/76 PH; 400/120
[58] Field of Search ..................... 346/76 PH; 400/120

[56] References Cited

U.S. PATENT DOCUMENTS

| | | | |
|---|---|---|---|
| 4,399,749 | 8/1983 | Arai | 101/211 |
| 4,443,121 | 4/1984 | Arai | 400/120 |
| 4,532,523 | 7/1985 | Tanaka | 346/76 PH |

Primary Examiner—E. A. Goldberg
Assistant Examiner—Gerald E. Preston
Attorney, Agent, or Firm—Michael N. Meller

[57] ABSTRACT

A gradation control device for a thermal printer, keeps a frequency of a reference clock pulse signal and a data transfer speed to a shift register constant, respectively. A linearity compensation circuit is provided between a data counter and a gate circuit and the gradation level or printing density is controlled by controlling heating times of heating elements within the constant data transfer time, so that a data transfer time for one printing density becomes equal to a maximum heating time of the heating element and a control range described by (maximum printing density)/(minimum printing density) can be set in terms of the period of the reference clock pulse signal to thereby finely control the printing density.

6 Claims, 6 Drawing Figures

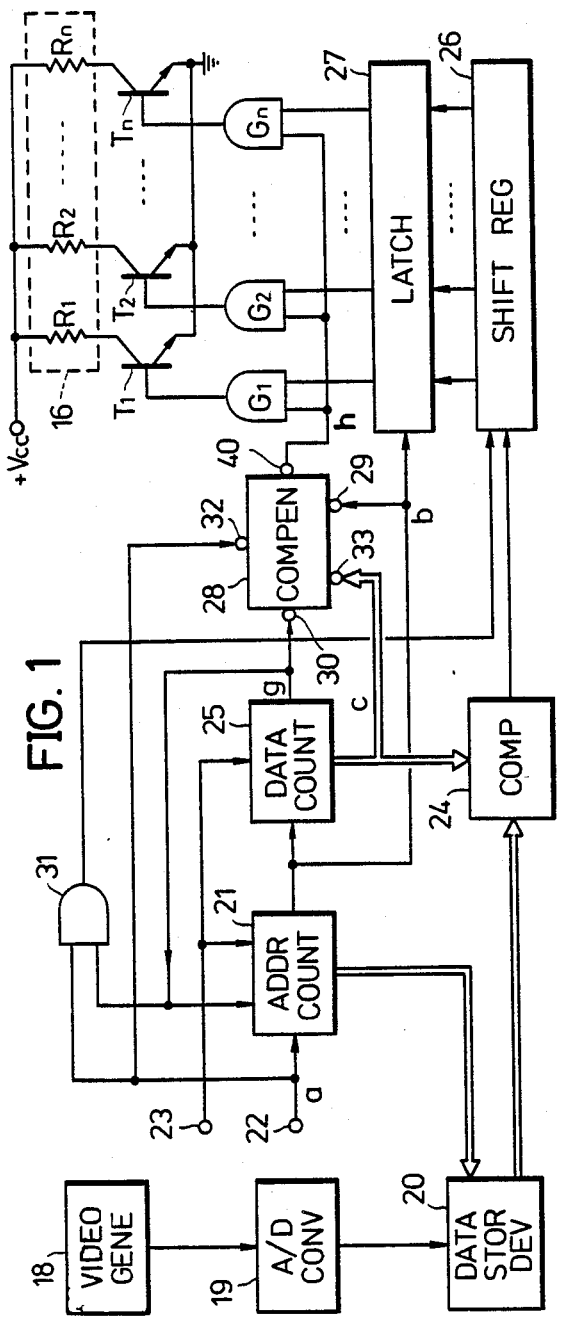
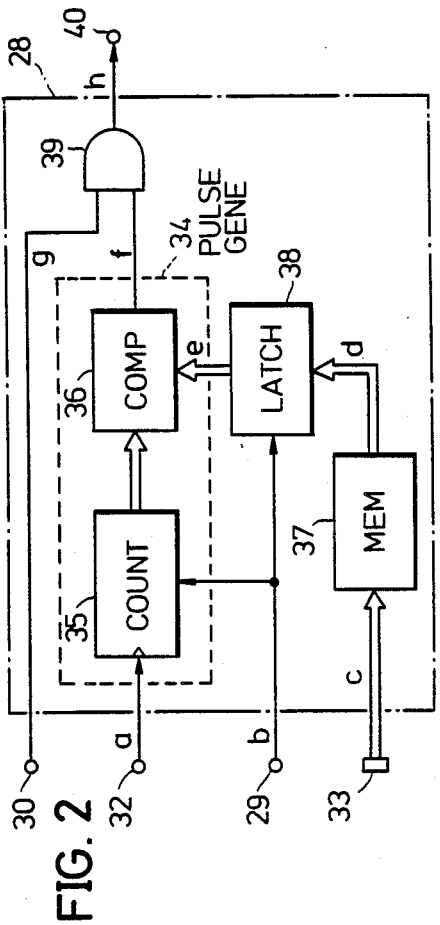
FIG. 1
FIG. 2

GRADATION CONTROL DEVICE FOR THERMAL INK-TRANSFER TYPE PRINTING APPARATUS

BACKGROUND OF THE INVENTION

The present invention generally relates to gradation (or density) control devices for thermal ink-transfer type printing apparatuses (hereinafter simply referred to as thermal printers), and more particularly to a gradation control device which controls the size of printing dots by an applying time of a constant current which is applied to heating elements of a thermal printing head in order to control the gradation level or printing density in a thermal printing apparatus.

Among therminal printers or hard-copy apparatuses such as wire-dot type and ink-jet type printers, thermal printers are being developed as one of the more promising type. For example, the thermal printer employs an ink film which is a polyester film having a thickness of 5 to 6 microns coated with a kind of ink which melts due to heat on one surface thereof. The ink film is placed onto a recording sheet with the ink side making contact with the recording sheet, and a thermal printing head makes contact with a rear side of the ink film. When a current flows through the thermal printing head so as to generate heat at the thermal printing head, the ink on the ink film melts at the position corresponding to the position of the thermal printing head, and the melted ink is transferred onto the recording sheet. The thermal printing head comprises a plurality of heating elements arranged in a row, and a current is successively applied to each of these heating elements.

The density which determines the gradation level of the printed characters, diagrams, pictures and the like, is determined by the area of each dot formed on the recording sheet due to the transfer of the melted ink onto the recording sheet. And, this area of the melted ink dot is determined according to the current applied to each of the heating elements. Generally, the heat value becomes larger as the magnitude of the current applied to the heating element becomes larger. As a result, the area of the melted ink dot becomes larger to increase the printing density, and the gradation level reaches near a saturated density. Accordingly, the magnitudes of the currents applied to the heating elements are conventionally controlled in order to control the gradation level of the printing. However, the currents applied to the heating elements are generally large currents in the order of 5 to 20 Amperes. Thus, it is difficult to control such large currents with a quick response speed, and there are disadvantages in that the size of the gradation control device becomes large and the gradation control device becomes expensive. Furthermore, it is impossible to increase the response speed when controlling such large currents, and there is a disadvantage in that the printing speed cannot be increased.

Accordingly, an improved tone (gradation) control device for a thermal printer was previously proposed in a U.S. Pat. No. 4,532,523 in which the assignee is the same as the assignee of the present application. This previously proposed tone control device controls the printing density by controlling the size of printing dots according to applying times of currents which are applied to the heating elements of the thermal printing head.

However, there is a problem in that the relationship between the printing density and the current applying time of the current which is applied to the heating element, that is, the relationship between the printing density and the heating time of the heating element, is not linear. In other words, the relationship between a maximum printing density obtained with a maximum heating time and a printing density obtained with a shorter heating time is non-linear, and an error is inevitably introduced between the printing density which is to be obtained and the printing density which is actually obtained.

Conventionally, as disclosed in a U.S. Pat. No. 4,399,749, there is a method of using as a reference clock pulse signal a signal which is obtained by frequency-dividing a pulse signal having a constant repetition frequency f1 with a dividing ratio which changes depending on a reference printing density datum, in order to eliminate the error in the printing density which is actually obtained. However, according to this system, it is necessary to transfer control data to a shift register (or a buffer register) at a maximum frequency of the reference clock pulse signal which changes depending on the reference printing density datum. For this reason, a maximum transfer speed of the control data becomes limited by devices which are used in the system. In this system, the frequency of the reference clock pulse signal is on the average considerably lower than a maximum allowable frequency of the devices which are used, and as a result, there is a problem in that it takes time to control the printing density. Consequently, it takes time to complete the printing operation.

In other words, since the system according to the U.S. Pat. No. 4,399,749 changes a frequency f2 of the reference clock pulse signal, a data transfer time for one printing density changes, where the data transfer time for one density is a sum of a time it takes to compare one printing density with hpicture element data of the dots corresponding to one printing line and a time it takes to transfer the compared results. Hence, a minimum heating time of the heating element is equal to the data transfer time for one printing density. For example, in the case where the maximum frequency of the reference clock pulse signal is 1 MHz, the number of heating elements is 256 and a buffer supplied with the compared results (control data) is constituted by a 256-bit shift register, the data transfer time for one printing density is 256 microseconds (=256/(1 MHz)). Accordingly, when a control range described by (maximum heating time)/(minimum heating time) is multiplied by ten, the data transfer time for a maximum printing density becomes 2.5 milliseconds (=256 microseconds×10) because the data transfer time for one printing density is equal to the minimum heating time. When an average of the data transfer time for one printing density is assumed to be 1.0 millisecond and the printing is carried out with 32 possible printing densities (that is, 32 gradations), it takes 32 milliseconds (=32×1.0 millisecond) to print the dots corresponding to one line. Therefore, this system has problems in that it takes a long time of approximately 32 milliseconds to print one line and the data transfer time for one printing density changes.

SUMMARY OF THE INVENTION

Accordingly, it is a general object of the present invention to provide a novel and useful gradation control device for a thermal printer, in which the problems described heretofore are eliminated.

Another and more specific object of the present invention is to provide a gradation control device for a thermal printer, in which a frequency of a reference clock pulse signal and a data transfer speed to a shift register are respectively kept constant, a linearity compensation circuit is provided between a data counter and a gate circuit, and the gradation level or printing density is controlled by controlling heating times of heating elements within the constant data transfer time. According to the gradation control device of the present invention, a data transfer time for one printing density becomes equal to a maximum heating time of the heating element, and a control range described by (maximum printing density)/(minimum printing density) can be set in terms of the period of the reference clock pulse signal. Hence, it is possible to more finely control the printing density compared to the conventional gradation control device.

Still another object of the present invention is to provide a gradation control device in which a pulse width of heating pulses applied to the heating elements is controlled so that the relationship between the heating time and the printing density becomes linear by use of a compensation table pre-stored in a memory. According to the gradation control device of the present invention, it is possible to approximately control linearly the printing density from the minimum printing density to the maximum printing density, and the printing can thus be carried out with an accurate printing density.

Other objects and further features of the present invention will be apparent from the following detailed description when read in conjunction with the accompanying drawings.

BRIEF DESCRIPTION OF THE DRAWINGS

FIG. 1 is a system circuit diagram showing an embodiment of the gradation control device according to the present invention;

FIG. 2 is a system circuit diagram showing an embodiment of a linearity compensation circuit within the circuit system shown in FIG. 1;

DETAILED DESCRIPTION

In FIG. 1, a thermal printing head 16 comprises a ceramic substrate and n heating elements (heating resistors) R1 through Rn provided on the substrate, where n is an interger greater than or equal to two. The printing head 16 is positioned on an ink film 11 shown in FIG. 5, and the n heating elements R1 through Rn are arranged in-line in a width direction of the ink film 11.

Figure 5:
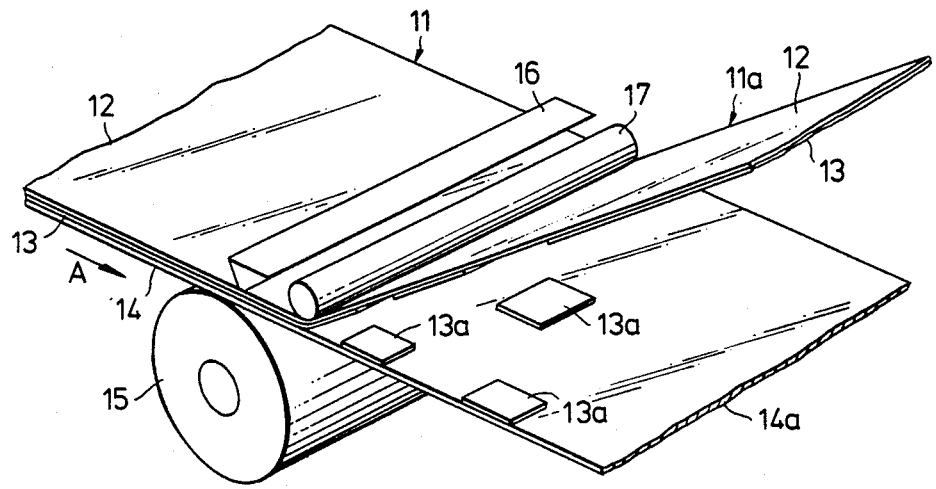
FIG. 5 is a general perspective view showing an essential part of an example of a thermal printer which may be applied with the gradation control device according to the present invention.

The gradation control device according to the present invention may be applied to a thermal printer having the conventional construction shown in FIG. 5. In FIG. 5, the ink film 11 acting as a transfer sheet, comprises a polyester film 12 and an ink 13 of a kind which melts due to heat coated over one surface of the polyester film 12 with a predetermined thickness. A recording sheet 14 makes contact with the side of the ink film 11 coated with the ink 13, and is fed along a direction A by a roller 15 together with the ink film 11. The printing head 16 is provided opposing the roller 15, and makes contact with the rear side of the ink film 11, that is, the side of the ink film 11 not coated with the ink 13.

Parts of the ink 13 on the ink film 11 corresponding to positions of the heating elements which are applied with a current out of the heating elements R1 through Rn constituting the printing head 16, melt and are transferred onto the recording sheet 14. After the ink film 11 passes by the printing head 16, the ink film 11 is guided by a roller 17, separated from the recording sheet 14 and then taken up on a take-up spool (not shown) as a used ink film 11a. A transferred ink 13a remains on a printed surface 14a of the printed recording sheet 14. The area of the transferred ink 13a is shown as a large area in FIG. 5 for convenience's sake, however, the transferred ink 13a actually is a collection of small dots.

One dot is formed by one heating element, and the size of one dot is determined by the magnitude of the current applied to a corresponding one of the heating elements R1 through Rn or an applying time for which the current is applied to the corresponding heating element. The density of the printed figures and the like, that is, the gradation level, is determined by the size of each of the dots.

The gradation control device according to the present invention may be applied to such a thermal printer of the type described above. Returning to the description of FIG. 1, an analog video signal from a video signal generator 18 is converted into a digital signal in an analog-to-digital (A/D) converter 19, and the digital signal is stored in a data storing device 20. On the other hand, an address counter 21 is supplied with a reference clock pulse signal from a terminal 12 and a start pulse from a terminal 23, and supplies an address to the data storing device 20. A reference printing density datum (that is, a datum of a reference gradation level, and hereinafter referred to as a second datum) successively changes from "0" which indicates a minimum printing density to "m-1" which indicates a maximum printing density, where m denotes the number of bits in an output datum of the data counter 25.

A density data comparing circuit 24 compares the size of the second datum and the sizes of n first data intended for the n heating elements R1 through Rn, for each of the m printing densities. An n-bit datum obtained as a result of the comparison with one second datum is passed through a shaft register 26 and is latched in a latch circuit 27. Hence, data (control data) obtained by the comparison of each of the m second data and the n first data corresponding to one printing line are successively latched in the latch circuit 27 for a total of m times.

The data storing device 20 supplies to the comparing circuit 24 one first datum (a first datum in the data obtained from the A/D converter 19) corresponding to a first address from the address counter 21. In this state, a count in the data counter 25 is set to "1", for example. The reference printing density datum (second datum) which is successively incremented according to the count is supplied to the comparing circuit 24 from the data counter 25. The comparing circuit 24 compares the first datum and the second datum "0" which indicates the minimum printing density, and supplies a control datum "1" when the first datum is greater than or equal to the second datum "0" and supplies a control datum "0" when the first datum is smaller than the second datum "0".

When the processing with respect to the first address is completed, the address counter 21 successively supplies the second, third, ..., and n-th addresses to the data storing device 20, and the data storing device 20 successively supplies to the comparing circuit 24 the first data corresponding to the second through n-th addresses. The first data corresponding to the first through n-th addresses respectively are the picture element data which are to be printed by the heating elements Rl through Rn. The comparing circuit 24 compares a second datum "1" and the first data corresponding to the second through n-th addresses, and similarly supplies a control datum "0" or "1" to the shift register 26 depending on the compared results. The n-bit control datum from the comparing circuit 24 corresponding to the first through n-th addresses are entered into the n-stage shift register 26 by being successively shifted therein in a synchronism with the reference clock pulse signal which is obtained from the terminal 22 via an AND circuit 31.

When the address counter 21 finishes counting n clock pulses and accordingly finishes outputting the first through n-th addresses, the address counter 21 supplies a data transfer pulse to the data counter 25 and the latch circuit 27. Furthermore, this data transfer pulse is also supplied to a linearity compensation circuit 28 via a terminal 29. The data counter 25 supplies a heating time limiting pulse to the compensation circuit 28 via a terminal 30 responsive to the data transfer pulse. This heating time limiting pulse is also supplied to the address counter 21 and the AND circuit 31. In addition, the data counter 21 increments the value "0" of the second datum to a value "1" which indicates the second smallest printing density.

The n-bit control datum which is entered into the shift register 26 is latched in parallel by the latch circuit 27 responsive to the data transfer pulse. The n-bit control datum latched by the latch circuit 27 is supplied in parallel to one of two input terminals of gate circuits G1 through Gn.

Next, the address counter 21 is reset by the heating time limiting pulse. Thus, the address counter 21 again successively outputs the first through n-th addresses so that the data storing device 20 outputs n first data and these n first data are compared with the second datum "1" in the comparing circuit 24. In this case where the second datum is "1", the data counter 25, the shift register 26, the latch circuit 27, the AND circuit 31 and the like operate similarly as in the case where the second datum is "0" as described before. Hence, latched control datum is supplied to the gate circuits G1 through Gn.

A compensation heating pulse from a terminal 40 of the compensation circuit 28 is applied to the other of the two input terminals of each of the gate circuits G1 through Gn. Output signals of the gate circuits G1 through Gn are applied to bases of corresponding NPN-type transistors T1 through Tn and controls the switching thereof. A current is applied to those heating elements which are coupled to collectors of the transistors which are turned ON, and the heating elements applied with the current are heated.

Figure 3:
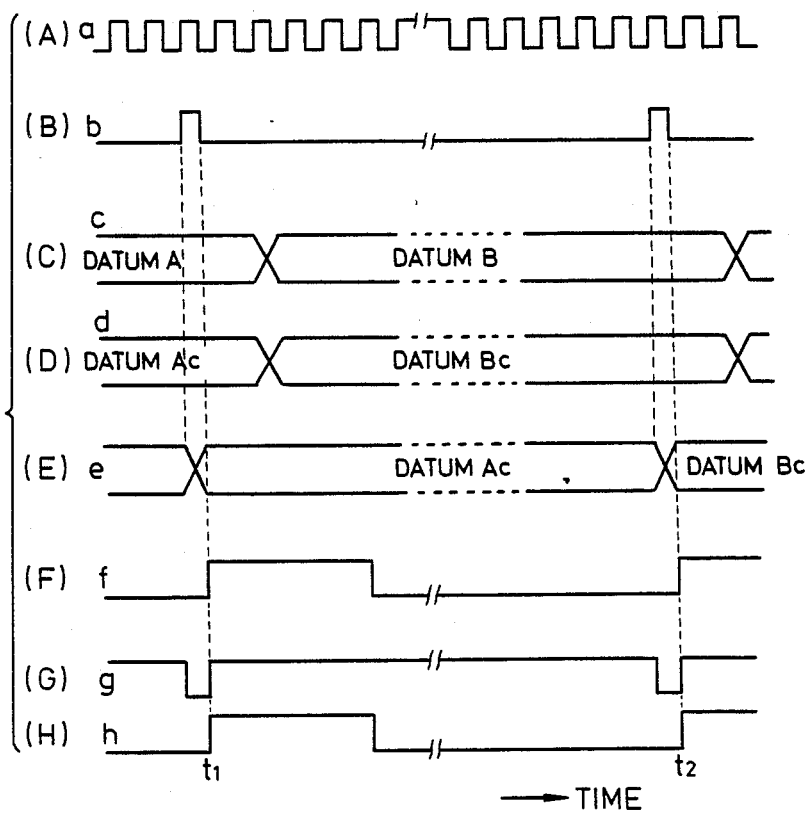
FIGS. 3(A) through 3(H) show signal waveforms for explaining the operation of the circuit system shown in FIG. 2.

The present embodiment is characterized in that the compensation circuit 28 is provided in the gradation control device shown in FIG. 1. Hence, description will now be given with respect to an embodiment of the compensation circuit 28 by referring to FIG. 2. In FIG. 2, the compensation circuit 28 comprises a pulse generator 34, a memory 37 for storing a compensation table, a latch circuit 38 and an AND circuit 39. A reference clock pulse signal a shown in FIG. 3(A) from the terminal 22 is applied to a terminal 32 and is supplied to a counter 35 within the pulse generator 35. On the other hand, second data c comprising data A, B, ... shown in FIG. 3(C) from the data counter 25 are applied to a terminal 33 and are supplied to the memory 37. The second data c are compensated so that the relationship between the heating time of the heating element and the printing density becomes linear by use of a compensation table which is pre-stored in the memory 37 and contains compensation data. Compensated second data d comprising compensated data Ac, Bc, ... shown in FIG. 3(D) are supplied to the latch circuit 38 from the memory 37. The latch circuit 38 latches the compensated second data d responsive to a rise in a data transfer pulse b shown in FIG. 3(B) which is obtained from the terminal 29.

Compensated data e comprising the compensated data Ac, Bc, ... shown in FIG. 3(E) are obtained from the latch circuit 38 and are supplied to a comparator 36 within the pulse generator 34. The counter 35 within the pulse generator 34 is cleared by the data transfer pulse b at the start of one density data transfer time, and counts the reference clock pulse signal a, where one density data transfer time is the time it takes to carry out the control with respect to the n heating elements Rl through Rn for one reference printing density. The comparator 36 compares the count from the counter 35 and the value of the compensated data e and generates a pules signal f shown in FIG. 3(F). The pulse signal rises at times t1, t2, ... corresponding to falling edges of the data transfer pulse b, and the pulse width of the pulse signal f varies depending on the value of each datum of the compensated data e. The pulse signal f is supplied to one input terminal of the AND circuit 39. A high-level heating time limiting pulse g shown in FIG. 3(G) from the data counter 25 is applied to the terminal 30 and is supplied to the other input terminal of the AND circuit 39. Accordingly, the pulse signal f passes through the AND circuit 39 as it is, and an output pulse signal h of the AND circuit 39 shown in FIG. 3(H) is outputted through the output terminal 40.

Figure 4:
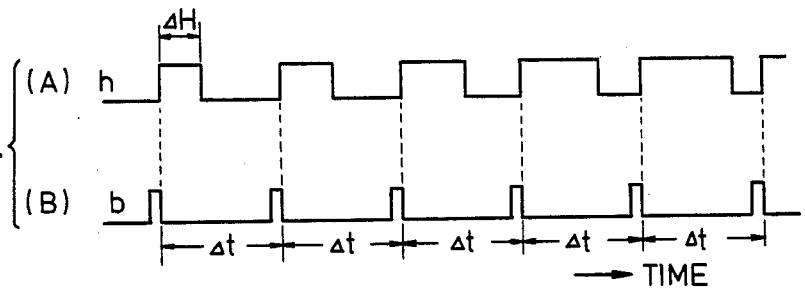
FIGS. 4(A) and 4(B) show signal waveforms for explaining the operation of the circuit system shown in FIG. 2.

In the present embodiment, the frequency of the reference clock pulse signal from the terminal 22 is constant. For this reason, the period $\Delta t$ of the data transfer pulse b becomes constant as shown in FIG. 4(B). The size of one reference printing density datum indicating one printing density (gradation level) and the sizes of the picture element data related to the n picture elements corresponding to one printing line are successively compared within one period $\Delta t$ of the data transfer pulse b, and the control datum based on the compared results is latched in the latch circuit 27 so as to control the heating times of the n heating elements Rl through Rn. Hence, one period $\Delta t$ of the data transfer pulse b is equal to one density data transfer time described before, and this one period $\Delta t$ of the data transfer pulse b is equal to the maximum heating time of the heating element.

On the other hand, the pulse signal h shown in FIG. 4(A) rises at times corresponding to the falling edges of the data transfer pulse b, and the pulse width of the pulse signal h varies depending on the value of each datum of the compensated data e. As a result, a pulse width ΔH of the pulse signal h successively increases as shown in FIG. 4(A).

The pulse signal h is supplied to the other input terminal of each of the gate circuits G1 through Gn shown in FIG. 1 via the terminal 40, as compensated heating pulses. A gated signal obtained by a gating process performed between the compensated heating pulse signal h and one of the bits constituting the control datum from the latch circuit 27 is outputted from each of the gate circuits G1 through Gn. The gated signals from the gate circuits G1 through Gn are supplied to the bases of the corresponding transistors T1 through Tn. The transistors T1 through Tn are each turned on for a time period in which the gated signal supplied to the base thereof has a high level. As a result, out of the heating elements R1 through Rn, those heating elements coupled to the collectors of the transistors which are turned ON are applied with the heating current and are consequently heated.

The printing is carried out in this manner by applying heating currents to selected heating elements for current applying times which vary depending on the printing density and the compensation data, in accordance with the parts on the recording sheet which are to be transferred with the melted ink.

When the data counter 25 outputs a reference printing density datum "m-1" which indicates the maximum printing density, the thermal printer finishes the printing of the picture element data corresponding to one printing line of the recording sheet 14. After the printing of one printing line is finished, the gradation control device again starts to compare a reference printing density datum with picture element data related to the next printing line. This comparison is successively performed for each of the printing densities from the minimum printing density to the maximum printing density.

Figure 6:
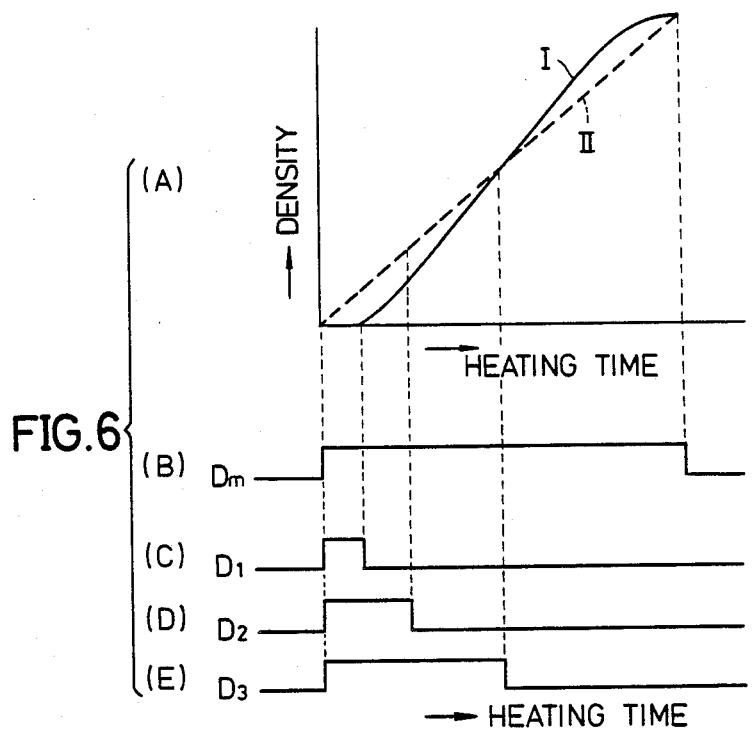
FIGS.6(A) is a graph showing the relationship between the recording time and the printing density and FIGS.6(B) through 6(D) respectively show an example of the heating time.

The relationship between the printing density and the heating time (that is, the current applying time or the recording time) in the conventional thermal printer is indicated by a solid line I in FIG. 6(A). As may be seen from FIG. 6(A), the relationship in the conventional thermal printer is non-linear. On the other hand, when the gradation control device according to the present invention is applied to the thermal printer, the relationship between the printing density and the heating time becomes approximately linear are indicated by a phantom line II in FIG. 6(A). In other words, according to the present invention, an approximately linear relationship exists between the printing density and the heating time for each of a heating time Dm for obtaining the maximum printing density and different heating times D1, D2 and D3 respectively shown in FIGS.6(C), 6(D) and 6(E) for obtaining printing densities smaller than the maximum printing density.

As described before, in the present embodiment, one density data transfer time is equal to the maximum heating time. Hence, in the case where the reference clock pulse signal has a frequency of 1 MHz and the number n of the heating elements R1 through Rn is equal to 256, for example, the maximum heating time is 256 microseconds (=256/(1 MHz)). Accordingly, when the printing is to be performed with 32 printing densities (gradation levels), it will only take approximately 8.2 milliseconds (=32×256 microseconds) to print one printing line.

Furthermore, according to the present embodiment, the control range described by (maximum printing density)/(minimum printing density) can be set in terms of the period of the reference clock pulse signal. When the frequency of the reference clock pulse signal and the frequency of the transfer clock pulse signal applied to the shift register 26 coincide, it is possible to make the control range 256 times wider at the maximum. For this reason, in the present embodiment, it is possible to control the printing density with 256 gradation levels.

The analog video signal generated from the video signal generator 18 may be an information related to images of other characters, diagrams and the like. In addition, the relationship between the printing density and the heating time is described by an approximately straight line in the embodiment described heretofore, but it is possible to describe the relationship by a predetermined curve.

Further, the present invention is not limited to these embodiments, but various variations and modifications may be made without departing from the scope of the present invention.

What is claimed is:

1. A gradation control device for a thermal ink-transfer type printing apparatus, said printing apparatus comprising a thermal printing head provided with n heating elements arranged in line, said n heating elements heating a transfer sheet coated with a kind of ink which melts due to heat and transferring the melted ink onto a recording sheet which makes contact with the transfer sheet to print images, said gradation control device comprising:

memory means for storing at least n digital data of natural binary code which represent gradation levels with which the printing is to be made;

converting means including means for repeatedly reading out the n digital data from said memory means in response to a clock pulse signal having a constant repetition frequency k times in a time period in which one line is printed and means for generating a reference printing density datum a value of which is changed every time the n digital data are read out once, said converting means producing control data in a form of a serial n-bit data signal having a constant bit rate in accordance with said constant repetition frequency every time the n digital data are read out once, each control datum constituting the serial n-bit data signal being "1" or "0" depending on whether each value of the n digital data is greater than or equal to the value of said reference printing density datum;

serial-to-parallel converting means for converting said serial n-bit data signal into a parallel n-bit data signal;

heating pulse generating means for generating k heating pulses for printing one line, said k heating pulses having a constant repetition frequency and pulse durations which are variable as a function of the value of the reference printing density datum; and driving means supplied with said parallel n-bit data signal and said heating pulses for supplying to each of said n heating elements having a corresponding control datum of the value "1" a current having a predetermined magnitude for the durations of the heating pulses, said function of the value of the reference printing density datum being set so that a non-linear characteristic of printed gradation level with respect to heating time of the head elements is compensated.

2. A gradation control device as claimed in claim 1 in which said converting means comprises means for generating k data transfer pulses in the time period in which one line is printed and heating time limiting pulses having a period identical to that of said data transfer pulses, said data transfer pulses having a period equal to a time it takes to carry out a control with respect to the heating elements for one reference printing density data, said heating pulse generating means comprising a memory pre-storing therein a compensation table and supplied with said reference printing density datum for outputting such a compensated datum that a relationship between the heating time of the heating element and the printing density becomes approximately linear by use of said compensation table, a latch circuit supplied with said data transfer pulses from said converting means as latch pulses for latching said compensated datum, a pulse generator supplied with said clock pulse signal, said data transfer pulses and said compensated datum for generating a pulse signal which has a pulse width in accordance with a value of said compensated datum and has a repetition frequency identical to that of said clock pulse signal, and a gate circuit supplied with said heating time limiting pulses from said converting means and the output pulse signal of said pulse generator for outputting as said heating pulses and output pulse signal of said pulse generator during a time period excluding a time period in which said latch circuit is performing a latching operation.

3. A gradation control device as claimed in claim 2 in which said pulse generator comprises a counter which is cleared with a constant period by said data transfer pulses and counts said clock pulse signal, and a comparator which compares a count in said counter and the value of said compensated datum, said comparator generating a pulse signal which has a first logic value when said count is greater than or equal to the value of said compensated datum and a second logic value when said count is smaller than the value of said compensated datum.

4. A gradation control device as claimed in claim 2 in which the value of said reference printing density datum is successively incremented by "1" for every period of said data transfer pulses, said heating pulse generating means generating heating pulses having a constant repetition frequency and pulse durations which gradually become large depending on a change in the value of the reference printing density datum.

5. A gradation control device as claimed in claim 1 in which said converting means comprises means for generating k data transfer pulses in the time period in which one line is printed, said data transfer pulses having a period equal to a time it takes to carry out a control with respect to the heating elements for one reference printing density data, said serial-to-parallel converting means comprising a shift register supplied with said serial n-bit data signal from said converting means and a latch circuit for latching in parallel an output parallel n-bit data signal of said shift register by said data transfer pulses from said converting means.

6. A gradation control device as claimed in claim 1 in which said driving means comprises n gate circuits and n switching transistors, each of said n gate circuits having one input terminal supplied with a datum of a corresponding bit of said parallel n-bit data signal from said serial-to-parallel converting means and another input terminal supplied with said heating pulses from said heading pulse generating means, each of said n gate circuits passing the datum of the corresponding bit of said parallel n-bit-data signal from said serial-to-parallel converting means supplied to the one input terminal thereof during a time period equal to the pulse duration of said heating pulses supplied to the other input terminal thereof, each of said n switching transistors having a collector coupled to a power source via a corresponding one of said n heating elements and a base coupled to an output terminal of a corresponding one of said n gate circuits, said n switching transistors being turned ON or OFF depending on values of output data of said n gate circuits to thereby control application of a current to said n heating elements.

* * * * *